United States Patent
Song et al.

[19]

[11] Patent Number: 6,148,027
[45] Date of Patent: Nov. 14, 2000

[54] METHOD AND APPARATUS FOR PERFORMING HIERARCHICAL MOTION ESTIMATION USING NONLINEAR PYRAMID

[75] Inventors: Xudong Song, Lawrenceville; Ya-Qin Zhang; Tihao Chiang, both of Plainsboro, all of N.J.

[73] Assignee: Sarnoff Corporation, Princeton, N.J.

[21] Appl. No.: 09/086,838

[22] Filed: May 29, 1998

Related U.S. Application Data

[60] Provisional application No. 60/048,181, May 30, 1997.
[51] Int. Cl.[7] .................................................. H04N 7/50
[52] U.S. Cl. ........................ 375/240; 348/398; 348/402; 382/240
[58] Field of Search ................................. 348/398, 397, 348/399, 408, 420, 437, 438, 403, 416, 402, 407, 413; 382/240, 248, 56, 41, 254

[56] References Cited

U.S. PATENT DOCUMENTS

| | | | |
|---|---|---|---|
| 4,718,104 | 1/1988 | Anderson | 382/41 |
| 4,933,761 | 6/1990 | Murakami et al. | 358/133 |
| 5,014,134 | 5/1991 | Lawton et al. | 358/261.3 |
| 5,241,395 | 8/1993 | Chen | 382/56 |
| 5,315,670 | 5/1994 | Shapiro | 382/56 |
| 5,398,067 | 3/1995 | Sakamoto | 348/403 |
| 5,600,373 | 2/1997 | Chui et al. | 348/397 |
| 5,717,789 | 2/1998 | Anderson et al. | 382/254 |
| 5,740,340 | 4/1998 | Purcell et al. | 395/118 |
| 5,867,602 | 2/1999 | Zandi et al. | 382/248 |

*Primary Examiner*—Howard Britton
*Attorney, Agent, or Firm*—William J. Burke

[57] ABSTRACT

An apparatus and a concomitant method for encoding image sequences and, more particularly, to a method for reducing the computational complexity in determining motion vectors for block-based motion estimation and for enhancing the accuracy of motion estimates through the use of non-linear pyramids.

20 Claims, 4 Drawing Sheets

METHOD AND APPARATUS FOR PERFORMING HIERARCHICAL MOTION ESTIMATION USING NONLINEAR PYRAMID

This application claims the benefit of U.S. Provisional Application Ser. No. 60/048,181 filed May 30, 1997, which is herein incorporated by reference.

The invention relates generally to an apparatus and a concomitant method for encoding image sequences and, more particularly, to a method for reducing the computational complexity in determining motion vectors for block-based motion estimation and for enhancing the accuracy of motion estimates.

BACKGROUND OF THE DISCLOSURE

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications which can benefit from efficient video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation/compensation (also known as motion-compensated interframe predictive video coding), which has been adopted by various international standards, such as ITU H.263, ISO MPEG-1 and MPEG-2.

In brief, the encoder only encodes the differences relative to areas that are shifted with respect to the areas coded. Namely, motion estimation is a process of determining the direction and magnitude of motion (motion vectors) for an area (e.g., a block or macroblock) in the current frame relative to one or more reference frames. Whereas, motion compensation is a process of using the motion vectors to generate a prediction (predicted image) of the current frame. The difference between the current frame and the predicted frame results in a residual signal (error signal), which contains substantially less information than the current frame itself. Thus, a significant saving in coding bits is realized by encoding and transmitting only the residual signal and the corresponding motion vectors.

One popular motion compensation method is the block matching algorithm (BMA), which estimates the displacements on a block-by-block basis. Namely, a current frame is divided into a number of blocks of pixels (referred to hereinafter as the current blocks). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. Once a block match is found, the location of the matching block in the search area in the previous frame relative to the location of the current block within the current frame defines a motion vector. This approach, i.e., comparing each current block to an entire selected search area, is known as a full search approach or the exhaustive search approach. The determination of motion vectors by the exhaustive search approach is computationally intensive, especially where the search area is particularly large. As such, these systems are relatively slow in processing the frames and may be limited in real-time applications.

Other motion estimation methods incorporate the concept of hierarchical motion estimation (HME), where an image is decomposed into a multiresolution framework, i.e., a pyramid. A hierarchical motion vector search is then performed, where the search proceeds from the lowest resolution to the highest resolution of the pyramid. Although HME has been demonstrated to be a fast and effective motion estimation method, the generation of the pyramid still incurs a significant amount of computational cycles.

Therefore, a need exists in the art for an apparatus and a concomitant method for reducing the computational complexity in determining motion vectors.

SUMMARY OF THE INVENTION

The present invention is an apparatus and method for reducing the computational complexity in determining motion vectors and for enhancing the accuracy of motion estimation methods. More specifically, the present invention decomposes each of the image frames within an image sequence into a non-linear pyramid. A hierarchical motion vector search is then performed on the nonlinear pyramid.

One important advantage in decomposing an image frame into a nonlinear pyramid is that the computational complexity is greatly reduced, since the generation of a nonlinear pyramid minimizes or eliminates the use of multiplication or addition operations. Thus, the present invention provides a hierarchical motion estimation with a significant reduction in computational complexity.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
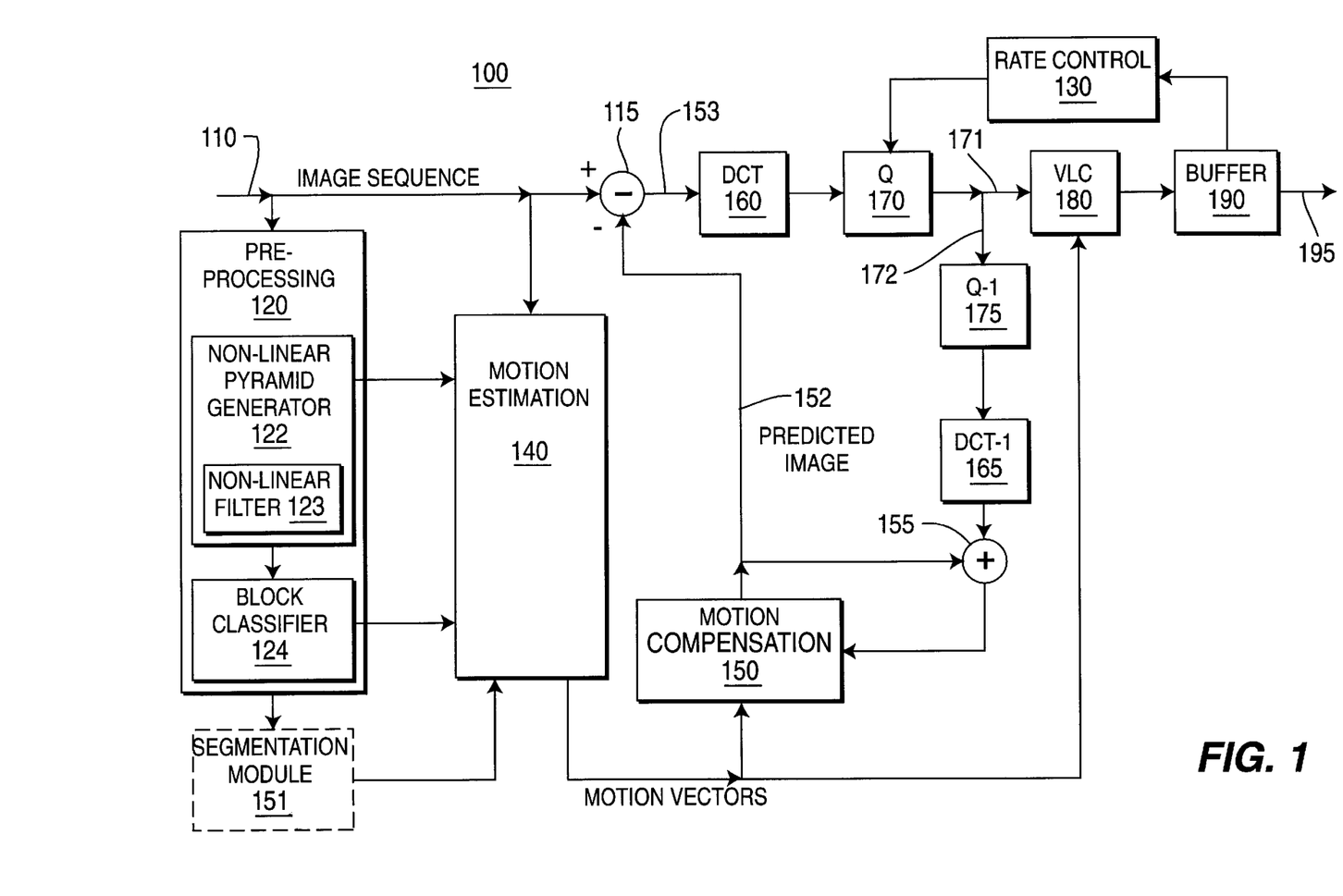
FIG. 1 illustrates a block diagram of the encoder of the present invention for reducing the computational complexity in determining motion vectors.

FIG. 1 depicts a block diagram of the apparatus 100 of the present invention for reducing the computational complexity in determining motion vectors, e.g., as used in a block-based hierarchical motion estimation. The preferred embodiment of the present invention is described below using an encoder, but it should be understood that the present invention can be adapted to image processing systems in general. Furthermore, the present invention can be employed in encoders that are in compliant with various coding standards. These standards include, but are not limited to, the Moving Picture Experts Group Standards (e.g., MPEG-1 (11172-*) and MPEG-2 (13818-*), H.261 and H.263.

The apparatus 100 is an encoder or a portion of a more complex block-based motion compensated coding system. The apparatus 100 comprises a motion estimation module 140, a motion compensation module 150, an optional segmentation module 151, a preprocessing module 120, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The following disclosure uses the MPEG standard terminology; however, it should be understood that the term macroblock or block is intended to describe a block of pixels of any size or shape that is used for the basis of encoding. Broadly speaking, a "macroblock" could be as small as a single pixel, or as large as an entire video frame.

In the preferred embodiment, the digitized input image signal undergoes one or more preprocessing steps in the preprocessing module 120. More specifically, preprocessing module 120 comprises a non-linear pyramid generator 122. The non-linear pyramid generator 122 employs a non-linear filter 123 to decompose or filter each frame into a plurality of different resolutions using a non-linear pyramid construction method to generate a "non-linear pyramid", where the different resolutions of the non-linear pyramid are correlated in a hierarchical fashion as described below. In the preferred embodiment, the non-linear pyramid is employed below to implement a hierarchical motion estimation process.

Although the present invention is implemented directly in conjunction with a motion estimation process, the present invention can be adapted to other image processing methods. For example, an optional block classifier module 124 can take advantage of the information provided in the non-linear pyramid of resolutions to quickly classify areas (blocks) as areas of high activity or low activity, thereby allowing feature detection within each frame. In turn, feature detection information can be used to assist a segmentation process within an optional segmentation module 151 to segment (or to simply identify) areas within each frame, e.g., background from foreground, or one object from another object, e.g., various features of a human face and the like.

Returning to FIG. 1, the input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In the preferred embodiment, the motion estimation module 140 also receives information from the preprocessing module 120 to enhance the performance of the motion estimation process.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. A rate control method may control the number of coding bits by adjusting the quantization scales.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

Figure 2:
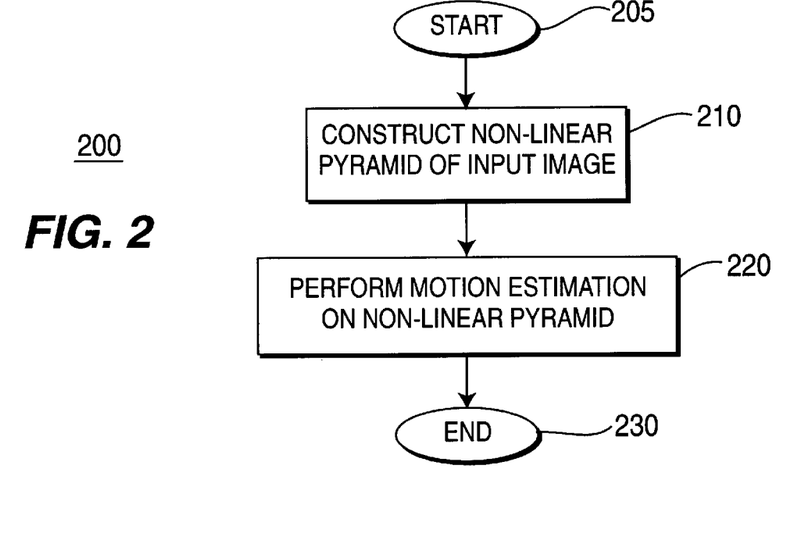
FIG. 2 illustrates a flowchart of a method for reducing the computational complexity in determining motion vectors for block-based motion estimation.

FIG. 2 illustrates a flowchart of a method 200 for reducing the computational complexity in determining motion vectors for block-based motion estimation. Namely, the method 200 enhances a block-based motion estimation method by quickly defining an initial search area where a match will likely occur.

More specifically, method 200 starts in step 205 and proceeds to step 210 where a non-linear pyramid is generated for each image frame in the image sequence. The non-linear pyramid generating method is described below with reference to FIGS. 3–5, and 7. The non-linear pyramid is a particular type of hierarchical pyramid.

Once the nonlinear pyramid is generated, motion estimation is performed in step 220 on the non-linear pyramid, where the search starts in the lowest level of resolution of the non-linear pyramid. Information obtained from this search is then utilized to refine the search in the next higher resolution of the non-linear pyramid and so on up to the highest level of resolution. This propagation of search information provides an efficient and fast method of performing motion estimation.

More specifically, hierarchical motion vector estimation is accomplished recursively from a higher level (lower resolution layer) to a lower level (higher resolution layer) of the non-linear pyramid. Thus, the computational complexity is reduced significantly due to the reduced image sizes at higher layers. In the preferred embodiment, the matching criterion used in the hierarchical block-based motion vector estimation is:

$$MAD_l(x, y) = \frac{1}{\hat{M}\hat{N}} \sum_{i=0}^{\hat{M}-1} \sum_{j=0}^{\hat{N}-1} |I_{1,k}(i, j) - I_{1,k-1}(i+x, j+y)| \quad (1)$$

$$-D_1 \le x, y \le D_1, l = 0, 1, 2, 3$$

where $I_{1,k}(i\ j)$ is the intensity of the pixel at location (i,j) within the block in the kth frame at the lth level and the displacement is (x, y). Thus, $I_{3,k}(i,j)$ is the intensity of the pixel on the full resolution image.

$\hat{M}$ and $\hat{N}$ are height and width of an subblock at level 1, respectively. M and N are height and width of an subblock at level 3, respectively. It should be noted that $$\hat{M} = \frac{M}{2^{3-l}} \text{ and } \hat{N} = \frac{N}{2^{3-l}}.$$

A block size of $\hat{M}\times\hat{N}$ ($M\times2^{l-3}\times N\times2^{l-3}$) is used in the subimage at level 1. With this structure, the number of motion blocks for all subimages is constant since a block at one resolution corresponds to the same position and the same objects at another resolution. Furthermore, the size of block varies with resolution. A smaller motion block corresponds to a lower resolution. The advantage of this variable block size method is that it appropriately weighs the importance of different layers and matches the human visual perception to different frequency at different resolution and can detect motions for small objects at the higher level of the pyramid. After nonlinear pyramids are constructed, the motion vectors at level 0 are first estimated using full search with Equation (1) and a block size of $\hat{M}\times\hat{N}$. The motion vector which provides the smallest $MAD_1(x,y)$ is selected as the coarse motion vector at this level and is propagated to the next lower level so that it is used as an initial vector for motion estimation at that level. Namely, the detected motion vector at the higher level is transmitted to the lower level and guides the refinement step at that level. This motion estimation process is repeated once more down to level 3.

Using two times the motion vector at level l-1 for level 1 as an initial vector, the motion vectors for level l are refined by using full search but with a relatively small search range. If the motion vector at level l-1 is represented by $V_{l-1}(x,y)$, the detected motion vector at level l can be described as:

$$V_l(x,y) = 2V_{l-1}(x,y) + \Delta V_l(\delta x, \delta y) \quad l=1,2,3 \quad (2)$$

where $\Delta V(\delta x, \delta y)$ is the updated increment of motion vector at level l and is expressed as:

$$\Delta V_l(\delta x, \delta y) = \arg \min \frac{1}{M'N'} \quad (3)$$

$$\sum_{i=0}^{M'-1} \sum_{j=0}^{N'-1} |I_{1,k}(i+x, j+y) - I_{1,k-1}(i+x+\delta x, j+y+\delta y)|$$

$$-D_1 \le \delta x, \delta y \le D_1, l = 1, 2, 3$$

In order to further reduce the prediction error between the original image and the motion-compensated image, the half pixel search is implemented in the proposed hierarchical motion vector estimation algorithm. The image with half pixel resolution is generated by using the interpolation from the image with full pixel resolution. The values of the spatially interpolated pixels are calculated using interpolation equation recommended by the MPEG TM4. The interpolation equation is as follows:

$$S(x+0.5,y)=(S(x,y)+S(x+1, y))/2$$

$$S(x,y+0.5)=(S(x,y)+S(x,y+1))/2 \quad (4)$$

$$S(x+0.5,y+0.5)=(S(x,y)+S(x+1,y)+S(x,y+1)+S(x+1, y+1))/4$$

where x, y are the integer-pixel horizontal and vertical coordinates, and S is the pixel value. Although the present invention employs the motion estimation process as expressed in equations (1)–(4), it should be understood that the present invention can be implemented with other motion estimation methods. Namely, the use of the non-linear pyramid can be used with any other motion estimation methods.

Figure 3:
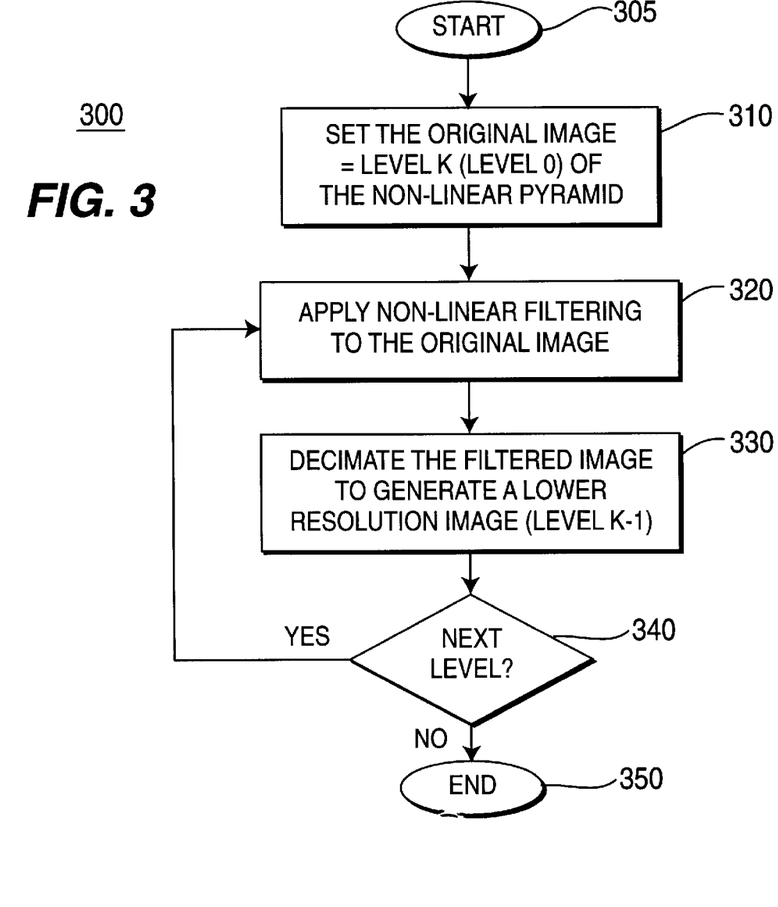
FIG. 3 illustrates a flowchart of a method for constructing a non-linear pyramid.

FIG. 3 illustrates a flowchart of a method 300 for constructing a non-linear pyramid. More specifically, method 300 starts in step 305 and proceeds to step 310, where initialization occurs. Namely, the original image $X_n$ (n=resolution level of the original image) is set equal to an image $X_k$ (k=resolution level of the non-linear image pyramid), which serves as the highest resolution level (level 0, i.e., k=0) of the non-linear image pyramid.

In step 320, method 300 applies a non-linear filter H to the image $X_k$, where the output of the non-linear filter H is represented by $H(X_k)$. The non-linear filter applies a non-linear function (or kernel) such as a 3×3 median function, a 5×5 median function, a weighted median 1 function and a weighted median 2 function. These functions are described below with reference to FIGS. 4 and 7.

Figure 4:
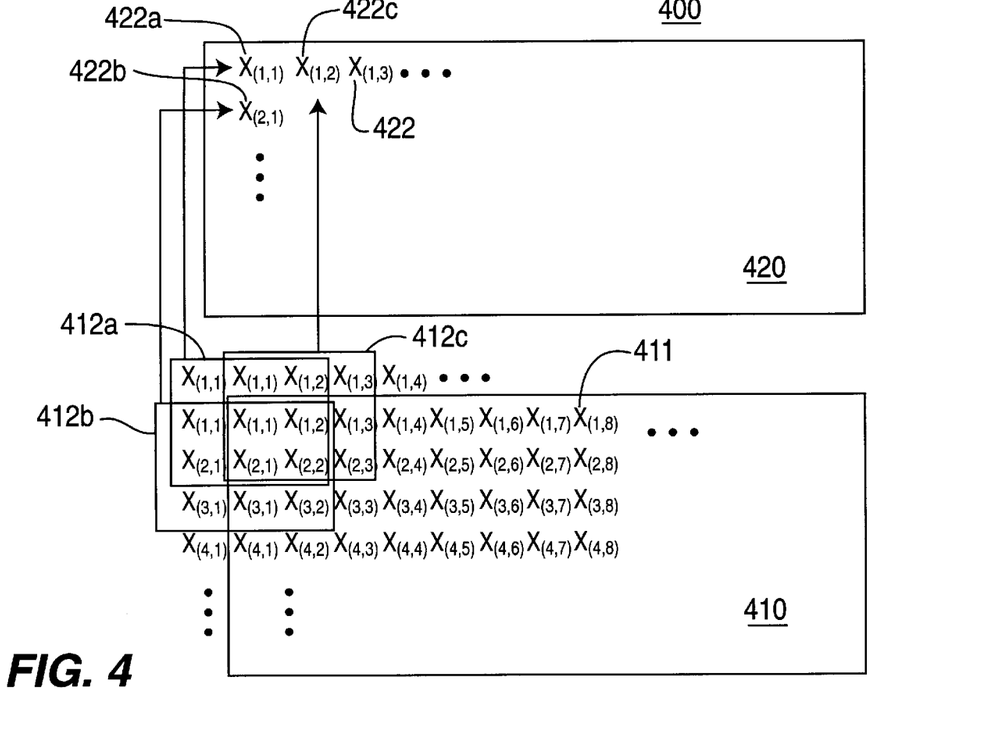
FIG. 4 illustrates a block diagram of applying a filtering operation on an image using a 3×3 median kernel.

More specifically, FIG. 4 illustrates a block diagram of applying a non-linear filtering operation on an image 410 using a 3×3 median kernel to produce a filtered image 420. In the present invention, the 3×3 median kernel can be expressed in three (3) different embodiments:

$$\begin{pmatrix} 1 & 1 & 1 \\ 1 & 1 & 1 \\ 1 & 1 & 1 \end{pmatrix} \quad (5)$$

$$\begin{pmatrix} 1 & 1 & 1 \\ 1 & 3 & 1 \\ 1 & 1 & 1 \end{pmatrix} \quad (6)$$

$$\begin{pmatrix} 1 & 2 & 1 \\ 2 & 3 & 2 \\ 1 & 2 & 1 \end{pmatrix} \quad (7)$$

In operation, each of the pixel values 411 in the image 410 is filtered by one of the above 3×3 median kernel to produce a corresponding pixel value 422 in the filtered image 420. The image 410 can be the original input image or a previously filtered and decimated image of the non-linear pyramid.

To illustrate, equation (5) represents a non-weighted 3×3 median kernel, i.e., each value in the kernel is weighted equally. To generate the filtered pixel $X_{(1,1)}$ 422a (upper left most pixel) in the filtered image 420, the 3×3 kernel (represented by the box labeled 412a) is applied to the corresponding pixel $X_{(1,1)}$ in the image 410, where the 3×3 kernel is centered on the pixel that is being filtered. In other words, the value of the filtered pixel $X_{(1,1)}$ 422a is determined by selecting the median of the nine (9) values covered by the 3×3 median kernel. However, with the 3×3 kernel centered on the pixel $X_{(1,1)}$, which is located at the corner of the image, there are insufficient pixel values to provide the necessary nine values as required by the 3×3 kernel. In such "border" pixels, the image is padded by duplicating adjacent "edge" pixel values to provide the necessary pixel values to the kernel. This edge padding provides the advantage of preserving the information located at the edges of the image, without introducing errors through the filtering process.

For example, within the box 412a, pixel value $X_{(1,1)}$ is duplicated three times and both pixels values $X_{(2,1)}$ and $X_{(1,2)}$ are duplicated once. If $X_{(1,1)}$ has a value 0, $X_{(1,2)}$ has a value 100, $X_{(2,1)}$ has a value 200, and $X_{(2,2)}$ has a value 255, then the filtered pixel $X_{(1,1)}$ 422a is determined by selecting a median from the group of pixel values (0, 0, 0, 0, 100, 100, 200, 200, 255), which will be 100. The filtered pixel 422b is similarly generated using the 3×3 kernel 412b, and the filtered pixel 422c is generated using the 3×3 kernel 412c and so on to form the entire filtered image 420.

Alternatively, the 3×3 median kernel can be weighted as illustrated in equations (2) and (3). Namely, various pixel values within the kernel are weighted or counted more heavily than other pixel values. For example, equation (6) demonstrates that the pixel value centered in the kernel is weighted three times more than the surrounding pixel values. This weight "x" can be viewed as a weighting, where the corresponding pixel values are duplicated by the weight x. Using the same example above, if a weighted 3×3 median of equation (6) is employed, then the filtered pixel $X_{(1,1)}$ 422a is determined by selecting a median from the group of pixel values (0, 0, 0, 0, 0, 0, 100, 100, 200, 200, 255), which will be 0 in this case. Namely, the kernel weighs or counts the center pixel value $X_{(1,1)}$ three times, thereby adding two additional "0" values to the group of pixel values.

Similarly, equation (7) demonstrates that other pixel values within the kernel can be weighted as well. Namely, aside from the center pixel value being weighted three times, the pixel values that are directly above, below, left and right of the center pixel value are weighted two times more than the remaining surrounding pixel values. Again, using the same example above, if a weighted 3×3 median of equation (7) is employed, then the filtered pixel $X_{(1,1)}$ 422a is determined by selecting a median from the group of pixel values (0, 0, 0, 0, 0, 0, 0, 0, 100, 100, 100, 200, 200, 200, 255), which will also be 0 in this case.

It should be understood that other weighted 3×3 median kernels can be employed in the present invention. However, the selection of a particular weighted median kernel is often dictated by the application and/or the content within the images.

Figure 7:
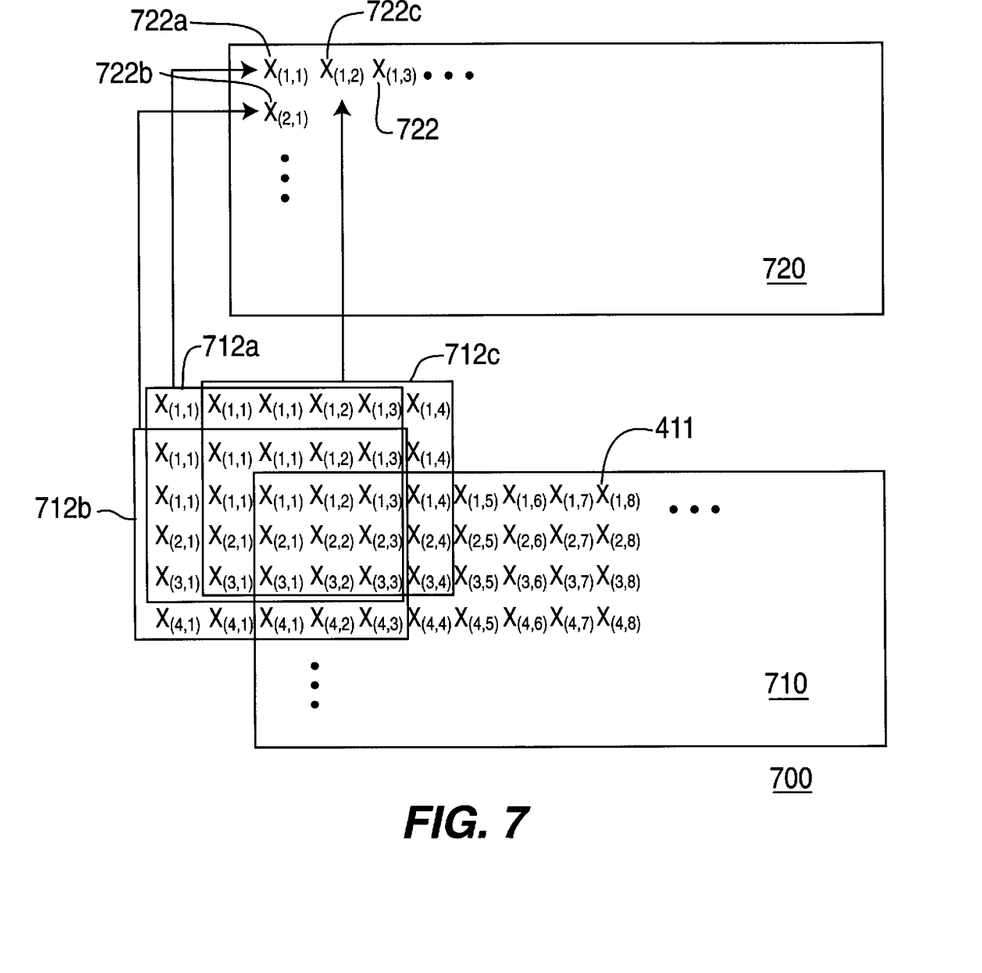
FIG. 7 illustrates a block diagram of applying a filtering operation on an image using a 5×5 median kernel.

Alternatively, FIG. 7 illustrates a block diagram of applying a non-linear filtering operation on an image 710 using a 5×5 median kernel to produce a filtered image 720. In the present invention, the 5×5 median kernel can be expressed as:

$$\begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix} \quad (8)$$

In operation, each of the pixel values 711 in the image 710 is filtered by one of the above 5×5 median kernel to produce a corresponding pixel value 722 in the filtered image 720. The image 710 can be the original input image or a previously filtered and decimated image of the non-linear pyramid.

To illustrate, equation (8) represents a non-weighted 5×5 median kernel, i.e., each value in the kernel is weighted equally. To generate the filtered pixel $X_{(1,1)}$ 722a (upper left most pixel) in the filtered image 720, the 5×5 kernel (represented by the box labeled 712a) is applied to the corresponding pixel $X_{(1,1)}$ in the image 710, where the 5×5 kernel is centered on the pixel that is being filtered. In other words, the value of the filtered pixel $X_{(1,1)}$ 722a is determined by selecting the median of the twenty five (25) values covered by the 5×5 median kernel. Again, with the 5×5 kernel centered on the pixel $X_{(1,1)}$, which is located at the corner of the image, there are insufficient pixel values to provide the necessary twenty five values as required by the 5×5 kernel. In such "border" pixels, the image is padded by duplicating adjacent "edge" pixel values to provide the necessary pixel values to the kernel as shown in FIG. 7.

For example, within the box 712a, pixel value $X_{(1,1)}$ is duplicated eight times and pixels values $X_{(2,1)}$, $X_{(3,1)}$, $X_{(1,2)}$ and $X_{(1,3)}$ are each duplicated twice. If $X_{(1,1)}$ has a value 0, $X_{(1,2)}$ has a value 50, $X_{(1,3)}$ has a value 100, $X_{(2,1)}$ has a value 75, $X_{(3,1)}$ has a value 125, $X_{(2,2)}$ has a value 200, $X_{(3,2)}$ has a value 255, $X_{(2,3)}$ has a value 255 and $X_{(3,3)}$ has a value 255, then the filtered pixel $X_{(1,1)}$ 722a is determined by selecting a median from the group of pixel values (0, 0, 0, 0, 0, 0, 0, 0, 0, 50, 50, 50, 75, 75, 75, 100, 100, 100, 125, 125, 125, 200, 255, 255, 255), which will be 75. The filtered pixel 722b is similarly generated using the 5×5 kernel 712b, and the filtered pixel 722c is generated using the 5×5 kernel 712c and so on to form the entire filtered image 720.

Similar to the 3×3 weighted median kernels, the 5×5 kernel can also be implemented with weights.

Figure 5:
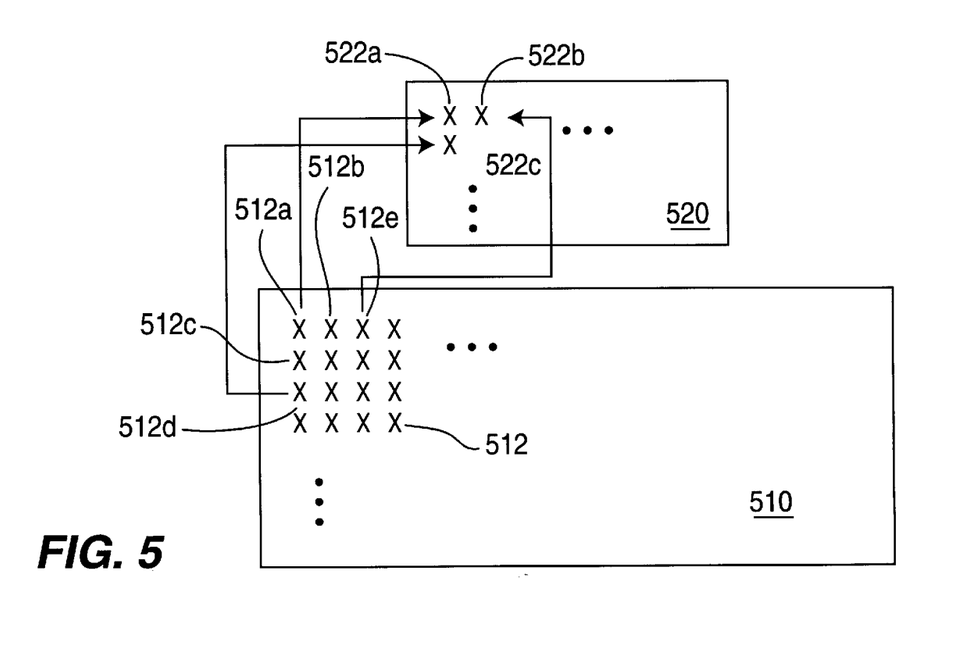
FIG. 5 illustrates a block diagram of the decimation process on an image to produce a lower resolution image.

Returning to FIG. 3, in step 330 method 300 decimates the filtered image in both directions (horizontal and vertical) by a predefined factor to generate a lower resolution image $X_{k-1}$ for the non-linear pyramid. FIG. 5 illustrates a block diagram of this decimation process on an image to produce a lower resolution image. Namely, an image, e.g., the filtered image 510 is reduced to a lower resolution image 520 by selectively removing pixels from the filtered image. In the preferred embodiment, the decimation factor is set to a value of two (2) in both directions, where every other pixel (horizontally and vertically) is discarded to form the lower resolution image $X_{k-1}$ 520. More specifically, pixels 512a, 512d and 512e are retained to form corresponding pixels 522a, 522c and 522b respectively in the lower resolution image 520. The pixels 512b and 512c are discarded in the decimation process, which is continued until the lower resolution image 520 is completely formed. Although the present invention employs a decimation factor of two, it should be understood that other decimation factor values can be employed in the present invention.

In step 340, method 300 queries whether to generate additional levels for the non-linear pyramid. If the query is affirmatively answered, then method 300 returns to step 320, where the filtering and decimating steps are repeated to generate the next lower resolution image $X_{k-2}$ and so on. If the query is negatively answered, then method 300 proceeds to step 350 and ends. In the preferred embodiment, a non-linear pyramid is generated for each input image, where the non-linear pyramid has four levels of resolution (levels 0–3). However, it should be understood that the non-linear pyramid can be generated with any number of levels of resolution and/or using other decimation factors other than "2". Generally, the non-linear pyramid can be generated in accordance with the requirement of a particular application or the specifics of the input image, e.g., size of the image, content of the image and so on. For example, a larger input image may require a larger non-linear pyramid.

Figure 6:
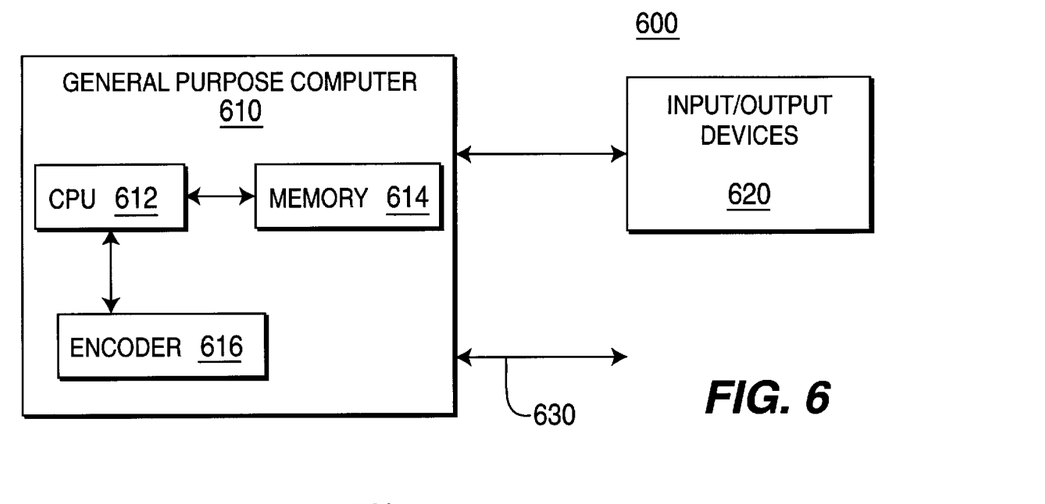
FIG. 6 illustrates a block diagram of an encoding system of the present invention.

FIG. 6 illustrates a block diagram of an encoding system 600 of the present invention. The encoding system comprises of a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 as discussed above. The encoder 616 can be a physical device, which is coupled to the CPU 612 through a communication channel. Alternatively, the encoder 616 can be represented by a software application (or a combination of a software application and hardware, e.g., via an application specific integrated circuit (ASIC)), where the software application is loaded from a storage device, e.g., a magnetic or optical disk, and resides in the memory 612 of the computer. The CPU 612 serves to execute the software application residing in the memory 614. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

Although various embodiments which incorporate the teachings of the present invention have been shown and described in detail herein, those skilled in the art can readily devise many other varied embodiments that still incorporate these teachings.

What is claimed is:

1. A method for performing motion estimation for an image, where said image is divided into at least one block, said method comprising the steps of:
   (a) decomposing the image into a non-linear pyramid; and
   (b) performing hierarchical motion estimation on said non-linear pyramid.

2. The method of claim 1, wherein said decomposing step (a) comprises the steps of:
   (a') applying a non-linear filter to the image to generate a filtered image; and
   (a") decimating said filtered image to generate a lower resolution image of said non-linear pyramid.

3. The method of claim 2, wherein said applying step (a") comprises the step of applying a median filter to said image.

4. The method of claim 3, wherein said median filter is a 3×3 median filter.

5. The method of claim 3, wherein said 3×3 median filter is a weighted filter.

6. The method of claim 3, wherein said median filter is a 5×5 median filter.

7. The method of claim 6, wherein said 5×5 median filter is a weighted filter.

8. The method of claim 2, wherein said decomposing step (a) further comprising the step of padding the edges of the image with adjacent pixel values.

9. A method for decomposing an image into a non-linear pyramid of images, said method comprising the steps of:
   (a) setting the image as a highest resolution image of the non-linear pyramid;
   (b) applying a non-linear filter to the image to generate a filtered image; and (c) decimating said filtered image to generate a lower resolution image of said non-linear pyramid.

10. The method of claim 9, wherein said applying step (b) and said decimating step (c) are repeated to generate lower resolution images of said non-linear pyramid.

11. The method of claim 9, wherein said applying step (b) comprises the step of applying a median filter to said image.

12. The method of claim 11, wherein said median filter is a 3×3 median filter.

13. The method of claim 12, wherein said 3×3 median filter is a weighted filter.

14. The method of claim 11, wherein said median filter is a 5×5 median filter.

15. The method of claim 14, wherein said 5×5 median filter is a weighted filter.

16. An apparatus for performing motion estimation for an image, where said image is divided into at least one block, said apparatus comprises:

a means for decomposing the image into a non-linear pyramid; and a means for performing hierarchical motion estimation on said non-linear pyramid.

17. The apparatus of claim 16, wherein said decomposing means comprises:

a non-linear filtering means for filtering the image into a filtered image; and a means for decimating said filtered image into a lower resolution image of said non-linear pyramid.

18. A computer-readable medium having stored thereon a plurality of instructions, the plurality of instructions including instructions which, when executed by a processor, cause the processor to perform the steps of:

(a) setting the image as a highest resolution image of the non-linear pyramid;

(b) applying a non-linear filter to the image to generate a filtered image; and (c) decimating said filtered image to generate a lower resolution image of said non-linear pyramid.

19. The computer-readable medium of claim 18, wherein applying step (b) comprises the step of applying a median filter to said image.

20. The computer-readable medium of claim 18, further comprising the step of:

(d) performing hierarchical motion estimation on said non-linear pyramid.

* * * * *